United States Patent
Krishnan

(10) Patent No.: US 10,576,011 B1
(45) Date of Patent: Mar. 3, 2020

(54) LIDAR BASED SENSING FOR VISUALLY IMPAIRED

(71) Applicant: Nethra Krishnan, Plano, TX (US)

(72) Inventor: Nethra Krishnan, Plano, TX (US)

(*) Notice: Subject to any disclaimer, the term of this patent is extended or adjusted under 35 U.S.C. 154(b) by 0 days.

(21) Appl. No.: 16/383,261

(22) Filed: Apr. 12, 2019

(51) Int. Cl.
| | |
|---|---|
| *H04B 3/36* | (2006.01) |
| *A61H 3/06* | (2006.01) |
| *G01S 7/481* | (2006.01) |
| *G01S 17/93* | (2020.01) |
| *G01S 17/10* | (2020.01) |
| *G02C 11/04* | (2006.01) |
| *G06F 3/01* | (2006.01) |
| *H04R 1/10* | (2006.01) |

(52) U.S. Cl.
CPC ............ *A61H 3/061* (2013.01); *G01S 7/4817* (2013.01); *G01S 17/102* (2013.01); *G01S 17/93* (2013.01); *G02C 11/04* (2013.01); *G06F 3/014* (2013.01); *H04R 1/1041* (2013.01); *A61H 2003/063* (2013.01); *A61H 2201/0188* (2013.01); *A61H 2201/5005* (2013.01); *A61H 2201/5015* (2013.01); *A61H 2201/5048* (2013.01); *A61H 2201/5092* (2013.01)

(58) Field of Classification Search
CPC ...... A61H 3/061; G01S 7/4817; H04W 28/04
USPC ........ 340/407.1, 540, 541, 425.5, 635, 638, 340/665; 382/114, 232, 266
See application file for complete search history.

(56) References Cited

U.S. PATENT DOCUMENTS

| | | | |
|---|---|---|---|
| 10,238,571 B2 * | 3/2019 | Matsuno | ................ A61H 3/061 |
| 10,251,788 B1 * | 4/2019 | Phan | ........................ A61F 9/08 |
| 2018/0243157 A1 * | 8/2018 | Takada | ..................... A61H 3/06 |

\* cited by examiner

*Primary Examiner* — Tai T Nguyen
(74) *Attorney, Agent, or Firm* — Microelectronic Devices IP LLC; Shawn T. Walsh

(57) ABSTRACT

A distance sensing mobility assistance apparatus to assist a visually impaired person includes a microcontroller, and a light detection and ranging (LiDAR) component, an audio signal component, a haptic signal component, and a light-emitting signal component, all interfaced to the microcontroller. The microcontroller includes instructions for reading a distance signal from the LiDAR component, producing an audio phase width modulation (PWM) signal for the audio signal component, based on the distance signal, a frequency of the audio FM signal being inversely dependent on a distance estimate based on the distance signal. The microcontroller includes instructions for producing a haptic PWM signal for the haptic signal component, based on the distance signal, a duty cycle of the haptic PWM signal being inversely dependent on the distance estimate. The microcontroller includes instructions for producing a current based on the distance signal, for the light-emitting signal component.

16 Claims, 8 Drawing Sheets

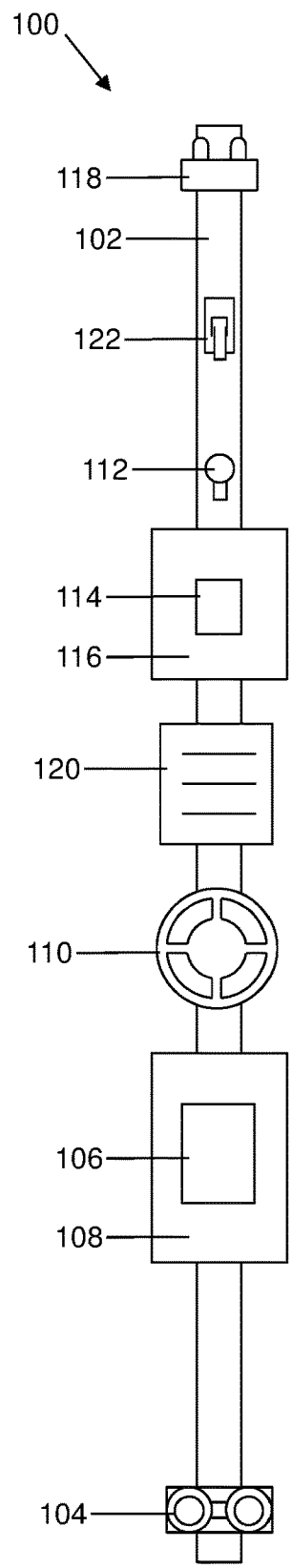
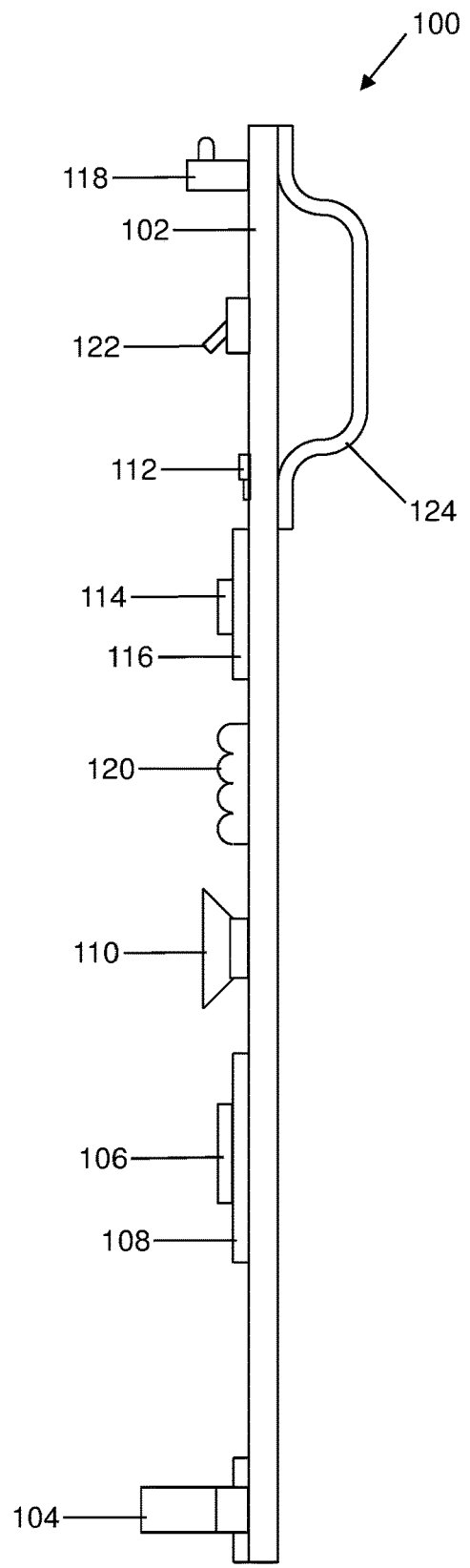
FIG. 1A
FIG. 1B

LIDAR BASED SENSING FOR VISUALLY IMPAIRED

FIELD OF THE INVENTION

This disclosure relates to the field of devices to assist visually impaired persons. More particularly, this disclosure relates to devices to assist visually impaired persons using light detection and ranging (LiDAR) components.

BACKGROUND OF THE INVENTION

Physical movement is one of the biggest challenges for blind people. Travelling and merely walking down the street can be quite daunting. Blind persons must memorize the location of every obstacle or item in their homes, which may be moved without knowledge of the blind persons. Portable global positioning systems (GPS) devices are available to the deaf-blind with connectivity to Braille Note or other devices. GPS devices may help blind persons in getting to the final destination; however these systems miss environmental information. While GPS technology can provide directions where to go, it does not consider any of the obstacles along the route. Canes provide limited information on obstacles beyond the length of the cane. Assistance dogs are costly and cumbersome to maintain.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

The present disclosure introduces a distance sensing mobility assistance apparatus to assist a visually impaired person. In one manifestation, the disclosed distance sensing mobility assistance apparatus includes a microcontroller, a light detection and ranging (LiDAR) component interfaced to the microcontroller, an audio signal component interfaced to the microcontroller, a haptic signal component interfaced to the microcontroller through a haptic driver component, and a light-emitting signal component interfaced to the microcontroller.

The microcontroller includes instructions for initiating a distance measurement by the LiDAR component, and instructions for reading a distance signal from the LiDAR component. The microcontroller includes instructions for calculating an estimated distance based on the distance signal.

The microcontroller includes instructions for producing an audio phase frequency modulation (FM) signal based on the estimated distance, wherein a frequency of the audio FM signal is inversely dependent on the estimated distance, and providing the audio FM signal to the audio signal component.

For the purposes of this disclosure, the terms "inversely dependent" and "inverse relationship" are understood to refer to a relationship between two parameters in which a value of the first parameter decreases when a value of the second parameter increases. The terms "inversely dependent" and "inverse relationship" may encompass a linear relationship having a negative slope, or a more complicated relationship.

The microcontroller includes instructions for producing a haptic pulse width modulation (PWM) signal based on the estimated distance, wherein a duty cycle of the haptic PWM signal is inversely dependent on the estimated distance, and providing the haptic PWM signal to the haptic driver component.

The microcontroller includes instructions for providing current, based on the estimated distance, to the light-emitting signal component.

In another aspect, the distance sensing mobility assistance apparatus includes a servo motor scanner coupled to the microcontroller and mechanically coupled to the LiDAR component. The microcontroller includes instructions for producing a scan PWM signal appropriate for actuating the servo motor scanner so that the LiDAR is scanned through a scanned arc of approximately 180 degrees. The microcontroller includes instructions for reading distance signals from the LiDAR component at angular positions in the scanned arc, and for generating distance estimates based on the distance signals.

The microcontroller includes instructions for producing left audio FM signals and right audio FM signals, based on the distance signals, and for providing the left audio FM signals to a left audio signal component, such as a left speaker of a headphone, and for providing the right audio FM signals to a right audio signal component, such as a right speaker of the headphone. Frequencies of the left audio FM signals and right audio FM signals are inversely dependent on the distance estimates, and amplitudes of the left audio FM signals and right audio FM signals may be adjusted to impart an indication of the directions in the scanned arc from which the distance signals were obtained.

The microcontroller includes instructions for producing left haptic PWM signals based on the distance signals in angular positions in a left arc section of the scanned arc, wherein frequencies of the left haptic PWM signals are inversely dependent on the distance estimates, and providing the left haptic PWM signals to a left haptic signal component, such as in a left area of a glove, through a left haptic driver component. The microcontroller also includes instructions for producing right haptic PWM signals based on the distance signals in angular positions in a right arc section of the scanned arc, wherein duty cycles of the right haptic PWM signals are inversely dependent on the distance estimates, and providing the right haptic PWM signals to a right haptic signal component, such as a right area of the glove, through a right haptic driver component. The microcontroller further includes instructions for producing center audio FM signals based on the distance signals in angular positions in a center arc section of the scanned arc, wherein duty cycles of the center audio FM signal are inversely dependent on the distance estimates, and providing the center audio FM signals to a center haptic signal component through a center haptic driver component.

The microcontroller may include instructions for producing left currents based on the distance signals in angular positions in a left arc section of the scanned arc, wherein average amplitudes of the left currents are inversely dependent on the distance estimates, and providing the left currents to a left light-emitting component, such as in a left area of a pair of eyeglasses. The microcontroller also includes instructions for producing right currents based on the distance signals in angular positions in a right arc section of the scanned arc, wherein average amplitudes of the right currents are inversely dependent on the distance estimates, and providing the right currents to a right light-emitting component, such as a right area of the eyeglasses. The microcontroller further includes instructions for producing center currents based on the distance signals in angular positions in a center arc section of the scanned arc, wherein average amplitudes of the center currents are inversely dependent on the distance estimates, and providing the center currents to both the left light-emitting component and the right light-emitting component.

In a further aspect, the microcontroller may include instructions for estimating a maximum direction corresponding to a maximum obstacle-free direction in the scanned arc from one or more sets of the distance estimates across the scanned arc. The microcontroller may include instructions for providing a maximum direction PWM signal, based on the estimated maximum direction, to a first directional servo motor with a first tactile directional element, so that the first tactile directional element indicates the estimated maximum direction. Similarly, the microcontroller may include instructions for estimating a minimum direction corresponding to a minimum obstacle-free direction in the scanned arc from the one or more sets of the distance estimates across the scanned arc. The microcontroller may include instructions for providing a minimum direction PWM signal, based on the estimated minimum direction, to a second directional servo motor with a second tactile directional element, so that the second tactile directional element indicates the estimated minimum direction.

BRIEF DESCRIPTION OF THE VIEWS OF THE DRAWINGS

FIG. 1A and FIG. 1B are a front view and a side view, respectively, of an example distance sensing mobility assistance apparatus.

DETAILED DESCRIPTION OF EXAMPLE EMBODIMENTS

Figure 2:
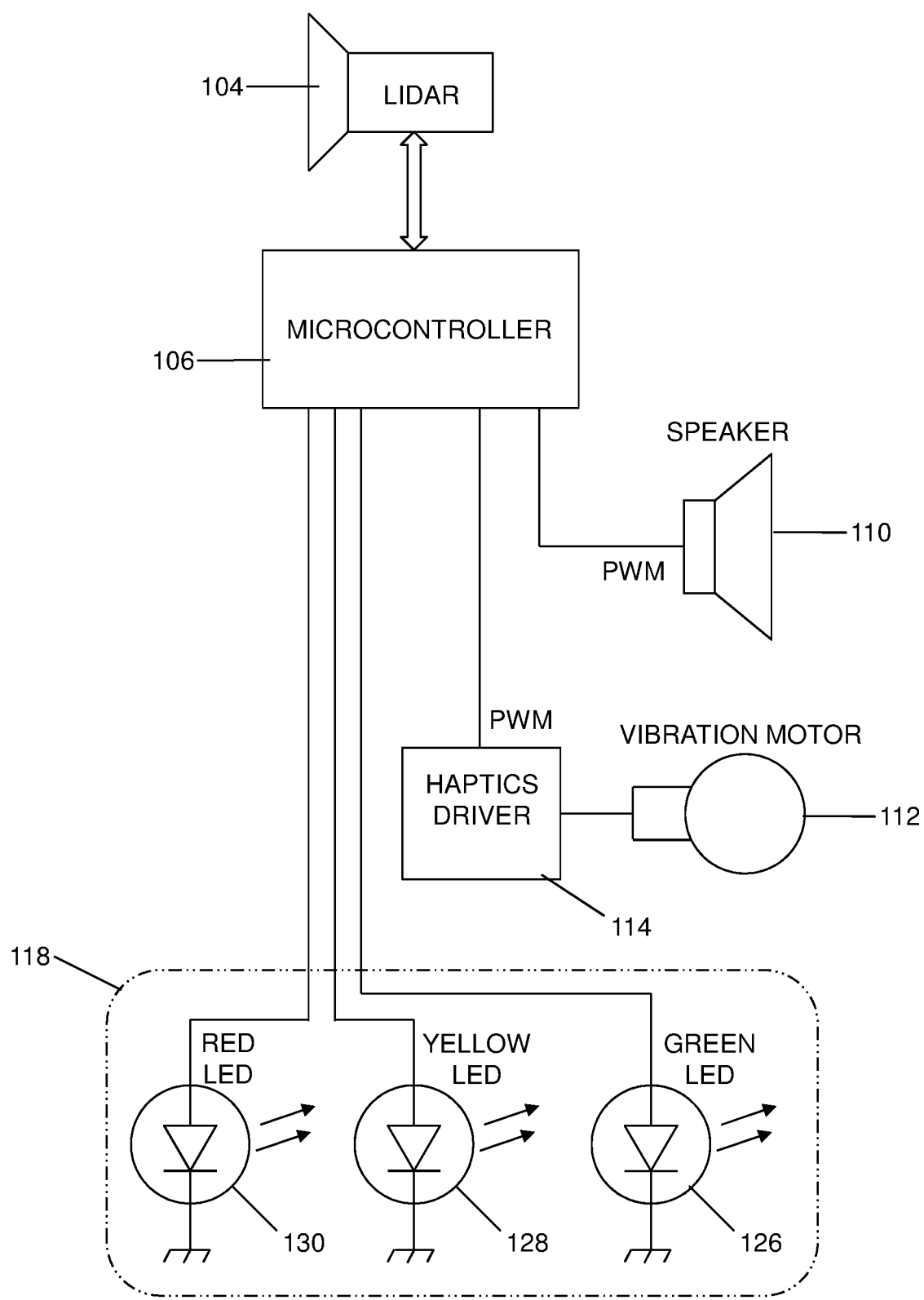
FIG. 2 is an example interface schematic for the components of the distance sensing mobility assistance apparatus of FIG. 1A and FIG. 1B.

The present invention is described with reference to the attached figures. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In addition, although some of the embodiments illustrated herein are shown in two dimensional views with various regions having depth and width, it should be clearly understood that these regions are illustrations of only a portion of a device that is actually a three dimensional structure. Accordingly, these regions will have three dimensions, including length, width, and depth, when fabricated on an actual device. Moreover, while the present invention is illustrated by embodiments directed to active devices, it is not intended that these illustrations be a limitation on the scope or applicability of the present invention. It is not intended that the active devices of the present invention be limited to the physical structures illustrated. These structures are included to demonstrate the utility and application of the present invention to presently preferred embodiments.

FIG. 1A and FIG. 1B are a front view and a side view, respectively, of an example distance sensing mobility assistance apparatus 100. The distance sensing mobility assistance apparatus 100 has a frame 102 which may be manifested as an aluminum channel or fiberglass channel, for example. The distance sensing mobility assistance apparatus 100 includes a light detection and ranging (LiDAR) component 104 mechanically coupled to the frame 102. In this example, the LiDAR component 104 may be directly coupled to the frame 102 in a fixed position. The LiDAR component 104 provide superior angular resolution compared to ranging components using light emitting diodes (LEDs), and provides superior response time compared to ranging components using ultrasonic components (sonar components). The LiDAR component 104 may be implemented as a Lidar Lite v3™ LiDAR component by Garmin, Ltd. The Lidar Lite v3™ advantageously provides simple interface commands for operation.

The distance sensing mobility assistance apparatus 100 includes a microcontroller 106 attached to the frame 102 through a microcontroller interface board 108. The microcontroller 106 may be implemented as an Arduino™ processor, which advantageously provides pre-programmed routines for interfacing with the LiDAR component 104 and for generating pulse width modulation (PWM) outputs and frequency modulation (FM) outputs. The microcontroller interface board 108 provides interface terminals for the microcontroller 106 and provides a mechanical coupling interface for attaching the microcontroller 106 to the frame 102. The microcontroller interface board 108 may be implemented as a RedBoard™ Dev-12757 by SparkFun Electronics. This disclosure describes examples in which the microcontroller 106 includes instructions for performing various functions or operations. The instructions may be included in memory elements in the microcontroller 106 or in memory components external to the microcontroller 106 which are readable by the microcontroller 106. The term "the microcontroller 106 includes instructions" is understood to include both implementations of the instructions.

The distance sensing mobility assistance apparatus 100 includes an audio signal component 110 attached to the frame 102. The audio signal component 110 may be implemented as a speaker, for example an 8 ohm speaker. The audio signal component 110 is available from various commercial electronic hobby vendors, such as SparkFun Electronics or Radio Shack. The audio signal component 110 is interfaced to the microcontroller 106.

The distance sensing mobility assistance apparatus 100 includes a haptic signal component 112 attached to the frame 102. The haptic signal component 112 may be implemented as a coin type vibration motor or other vibrating component. The haptic signal component 112 is available from various commercial electronic hobby vendors, such as SparkFun Electronics or Radio Shack. The distance sensing mobility assistance apparatus 100 includes a haptic driver component 114 attached to the frame 102 through a driver interface board 116. The driver interface board 116 provides interface terminals for the haptic driver component 114. The haptic driver component 114 may be implemented as a Texas Instruments™ DRV2605L Haptic Driver device. The haptic driver component 114 is interfaced to the haptic signal component 112 through the driver interface board 116. The haptic driver component 114 is interfaced to the microcontroller 106.

The distance sensing mobility assistance apparatus 100 includes a light-emitting signal component 118 attached to the frame 102. The light-emitting signal component 118 may be implemented with one of more LEDs, for example.

The distance sensing mobility assistance apparatus 100 includes power source 120 attached to the frame 102. The power source 120 may be implemented as a battery pack, a supercapacitor, or a fuel cell, for example. The power source 120 may be controlled by a switch 122, attached to the frame 102 as depicted in FIG. 1A and FIG. 1B, or attached to the power source 120.

The microcontroller 106 is interfaced to the LiDAR component 104, the audio signal component 110, the haptic driver component 114, and the light-emitting signal component 118, through the microcontroller interface board 108. Power terminals of the microcontroller 106 is electrically coupled to the power source 120. Wiring for interfacing the components of the distance sensing mobility assistance apparatus 100 is not shown in FIG. 1A and FIG. 1B to avoid obscuring the arrangement of the components, that is, the microcontroller 106, the LiDAR component 104, the audio signal component 110, the haptic signal component 112, the haptic driver component 114, and the light-emitting signal component 118.

The distance sensing mobility assistance apparatus 100 may further include a handle 124 attached to the frame 102 to facilitate use of the distance sensing mobility assistance apparatus 100. The components of the distance sensing mobility assistance apparatus 100 may be distributed on the frame 102 to provide a desired balance with respect to the handle 124. The distance sensing mobility assistance apparatus 100 may have a total mass less than 1.5 kilograms, to facilitate hand-held usage by a user.

FIG. 2 is an example interface schematic for the components of the distance sensing mobility assistance apparatus 100 of FIG. 1A and FIG. 1B. Referring to FIG. 2, the microcontroller 106 is interfaced to the LiDAR component 104 through a two-way interface, so that signals to initiate a LiDAR measurement may be passed from the microcontroller 106 to the LiDAR component 104, and distance information may be passed from the LiDAR component 104 to the microcontroller 106. The microcontroller 106 includes instructions for initiating a distance measurement by the LiDAR component 104, instructions for reading a distance signal from the LiDAR component 104, and instructions for calculating an estimated distance based on the distance signal.

The audio signal component 110 is interfaced to an FM output terminal of the microcontroller 106, so that an audio FM signal may be passed from the microcontroller 106 to the audio signal component 110 to produce an audio signal at an audible frequency. The microcontroller 106 includes instructions for producing the audio FM signal based on the estimated distance, wherein a frequency of the audio FM signal is inversely dependent on the estimated distance, and providing the audio FM signal to the audio signal component.

The haptic driver component 114 is interfaced to a PWM output terminal of the microcontroller 106, so that a haptic PWM signal may be passed from the microcontroller 106 to the haptic driver component 114. The haptic driver component 114 is interfaced to the haptic signal component 112, so that a haptic driver signal may be passed from the haptic driver component 114 to the haptic signal component 112 to produce a haptic signal, such as a vibration at a desired duty cycle. For the purposes of this disclosure, the term "duty cycle" is understood to refer to the fraction of one cycle of the haptic PWM signal which is in a high, or "on", state. For example, a duty cycle of 25 percent would apply to the haptic PWM signal which is in the high state 25 percent of each cycle, and in a low state 75 percent of each cycle. The microcontroller 106 includes instructions for producing the haptic PWM signal based on the estimated distance, wherein a duty cycle of the haptic PWM signal is inversely dependent on the estimated distance, and instructions for providing the haptic PWM signal to the haptic driver component.

The light-emitting signal component 118 is interfaced to one or more current terminals of the microcontroller 106. The light-emitting signal component 118 may be implemented as one or more LEDs, for example, as a green LED 126, a yellow LED 128, and a red LED 130, as depicted in FIG. 2. Each of the LEDs 126, 128, and 130, is interfaced to a separate current terminal of the microcontroller 106, so that currents may be passed to the LEDs 126, 128, and 130, to produce green, yellow, and red light signals. The microcontroller 106 includes instructions for producing the currents based on the estimated distance, and providing the currents to the light-emitting signal component 118.

During operation of the distance sensing mobility assistance apparatus 100 of FIG. 1A and FIG. 1B, the microcontroller 106 sends an initiate signal to the LiDAR component 104 to initiate a distance measurement. The LiDAR component 104 executes a distance measurement and sends a distance signal to the microcontroller 106 having distance information based on the distance measurement. The microcontroller 106 calculates a distance estimate based on the distance information.

Figure 3:
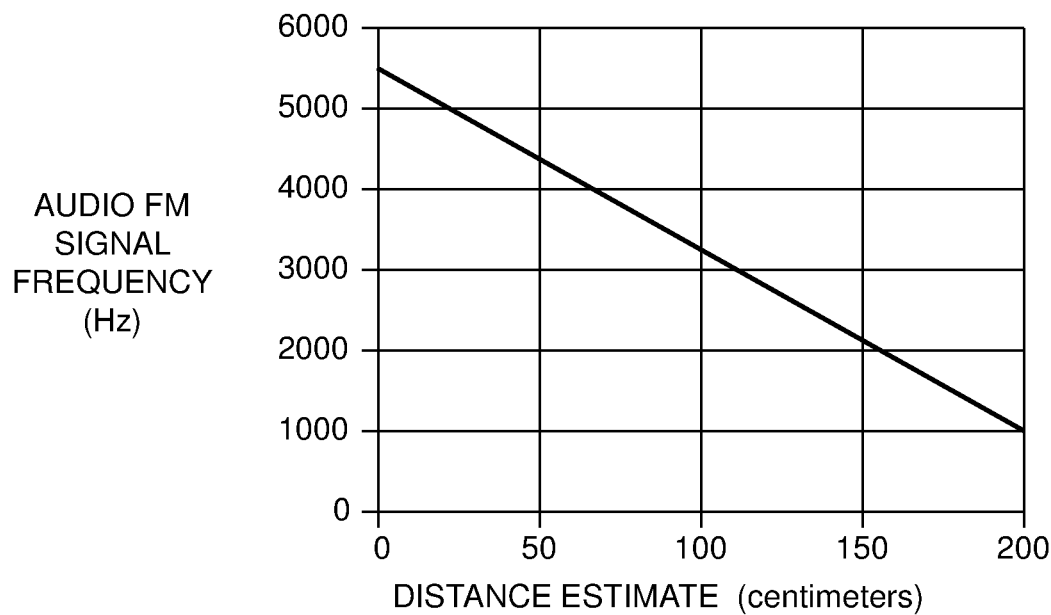
FIG. 3 is a chart with an example inverse relationship between the frequency of the audio FM signal and the distance estimate.

The microcontroller 106 generates an audio FM signal having a frequency with an inverse relationship to the distance estimate. FIG. 3 is a chart with an example inverse relationship between the frequency of the audio FM signal and the distance estimate. In the example inverse relationship depicted in FIG. 3, the microcontroller 106 would generate an audio FM signal having a frequency of approximately 4400 Hertz (Hz) for a distance estimate of 50 centimeters (cm). Similarly, the microcontroller 106 would generate an audio FM signal having a frequency of approximately 1000 Hz for a distance estimate of 200 cm. The audio FM signal is sent to the audio signal component 110, which generates an audio signal having the frequency of the audio FM signal. Thus, the frequency of the audio FM signal increases as the distance estimate decreases, providing the user with an audio signal that may be interpreted by the user as an estimate of the distance to an object in the direction in which the LiDAR component 104 is oriented. The inverse relationship of the audio FM signal frequency to the distance estimate may advantageously assist the user in avoiding obstacles.

Figure 4:
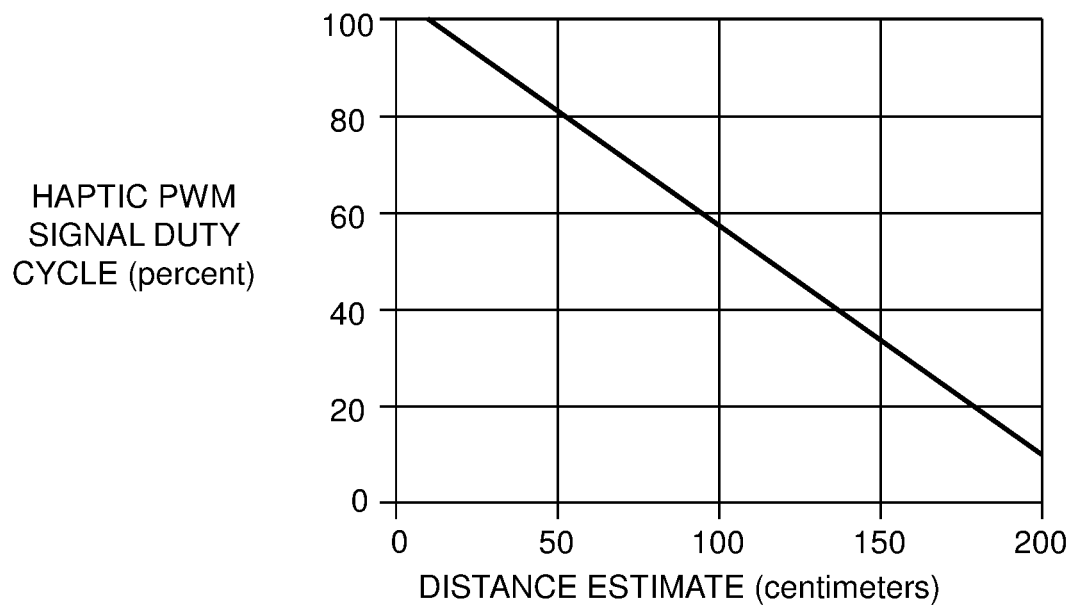
FIG. 4 is a chart with an example inverse relationship between the duty cycle of the haptic PWM signal and the distance estimate.

The microcontroller 106 generates a haptic PWM signal having a duty cycle with an inverse relationship to the distance estimate obtained from the LiDAR component 104. FIG. 4 is a chart with an example inverse relationship between the duty cycle of the haptic PWM signal and the distance estimate. In the example inverse relationship depicted in FIG. 4, the microcontroller 106 would generate a haptic PWM signal having a duty cycle of approximately 81 percent for a distance estimate of 50 cm. Similarly, the microcontroller 106 would generate a haptic PWM signal having a duty cycle of approximately 10 percent for a distance estimate of 200 cm. The haptic PWM signal is sent to the haptic driver component 114, which sends a haptic driver signal to the haptic signal component 112, which produces a haptic signal that is sensible by the user. Haptic PWM signals with higher duty cycles result in stronger haptic signals sensible by the user. Thus, the strength of the haptic signal increases as the distance estimate decreases, providing the user with a haptic signal that may be interpreted by the user as an estimate of the distance to an object in the direction in which the LiDAR component 104 is oriented. The inverse relationship of the haptic PWM signal duty cycle to the distance estimate may advantageously assist the user in avoiding obstacles. The haptic signal may be particularly useful to users that are hearing-impaired and thus may not be able to sufficiently interpret the audio signal.

The microcontroller 106 generates one or more currents which are sent to the light-emitting signal component 118, based on the distance estimate obtained from the LiDAR component 104. The currents may be generated so as to provide a visual warning to the user when obstacles occur at less than prescribed distances. By way of example, the light-emitting signal component 118 may be implemented with a green LED 126, a yellow LED 128, and a red LED 130, as depicted in FIG. 2, with a green LED signal from the microcontroller 106 to the green LED 126, and similarly for a yellow LED signal and a red LED signal. For distance estimates of 100 cm to 200 cm, the green current may turn on the green LED 126, while the yellow current and the red current are set to zero to turn off the yellow LED 128 and the red LED 130, respectively. For distance estimates of 20 cm to 100 cm, the yellow current may turn on the yellow LED 128, while the green current and the red current are set to zero turn off the green LED 126 and the red LED 130, respectively. For distance estimates less than 20 cm, the red current may turn on the red LED 130, while the green current and the yellow current are set to zero to turn off the green LED 126 and the yellow LED 128, respectively. Green, yellow and red light from the light-emitting signal component 118 may be useful to users that have some visual capability, particularly in noisy environments which interfere with the audio and haptic signals.

Figure 5:
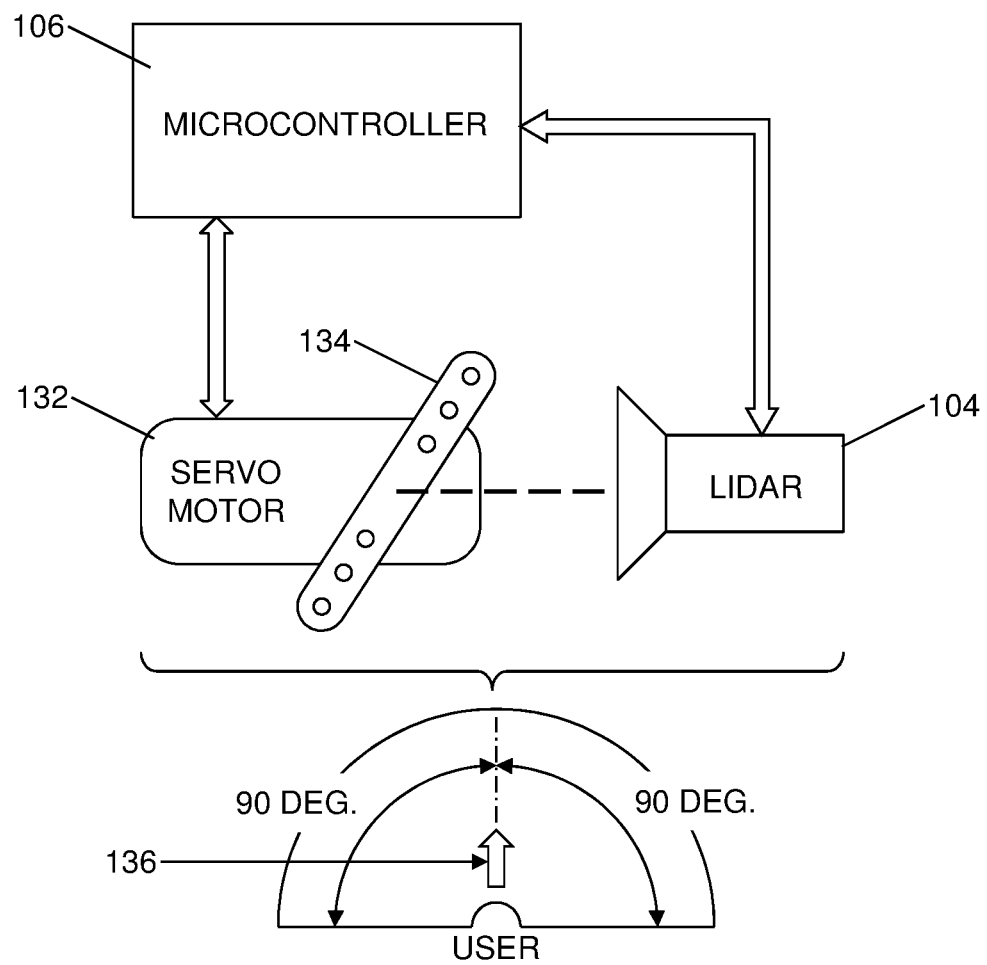
FIG. 5 depicts a scanning mechanism for the LiDAR component.

The distance sensing mobility assistance apparatus 100 of FIG. 1A and FIG. 1B may be enhanced by adding a scanning capability to the LiDAR component 104, as depicted in FIG. 5. In this example, a LiDAR scan servo motor 132 is attached to the frame 102 of FIG. 1A and FIG. 1B. The LiDAR scan servo motor 132 includes a scanned member 134 such as a mounting bracket. The LiDAR component 104 is mechanically coupled to the scanned member 134, so that the LiDAR component 104 is rotated when the LiDAR scan servo motor 132 is actuated. The LiDAR scan servo motor 132 is interfaced to the microcontroller 106. The microcontroller 106 includes instructions for scanning the LiDAR scan servo motor 132. During operation of the distance sensing mobility assistance apparatus 100, the microcontroller 106 sends scan signals to the LiDAR scan servo motor 132, so that the LiDAR component 104 is scanned through an angle around the user, denoted "USER" in FIG. 5. The LiDAR component 104 may be scanned through an angle of approximately 90 degrees on each side of a forward direction 136 from the user, as indicated in FIG. 5, to provide a total scan angle of approximately 180 degrees. The distance sensing mobility assistance apparatus 100 may provide audio, haptic, and light-emitting signals as the LiDAR component 104 is scanned. Scanning the LiDAR component 104 through an angle of approximately 90 degrees on two sides of the user may provide information to the user about obstacles in front of, and on both sides of, the user's intended path.

Figure 6:
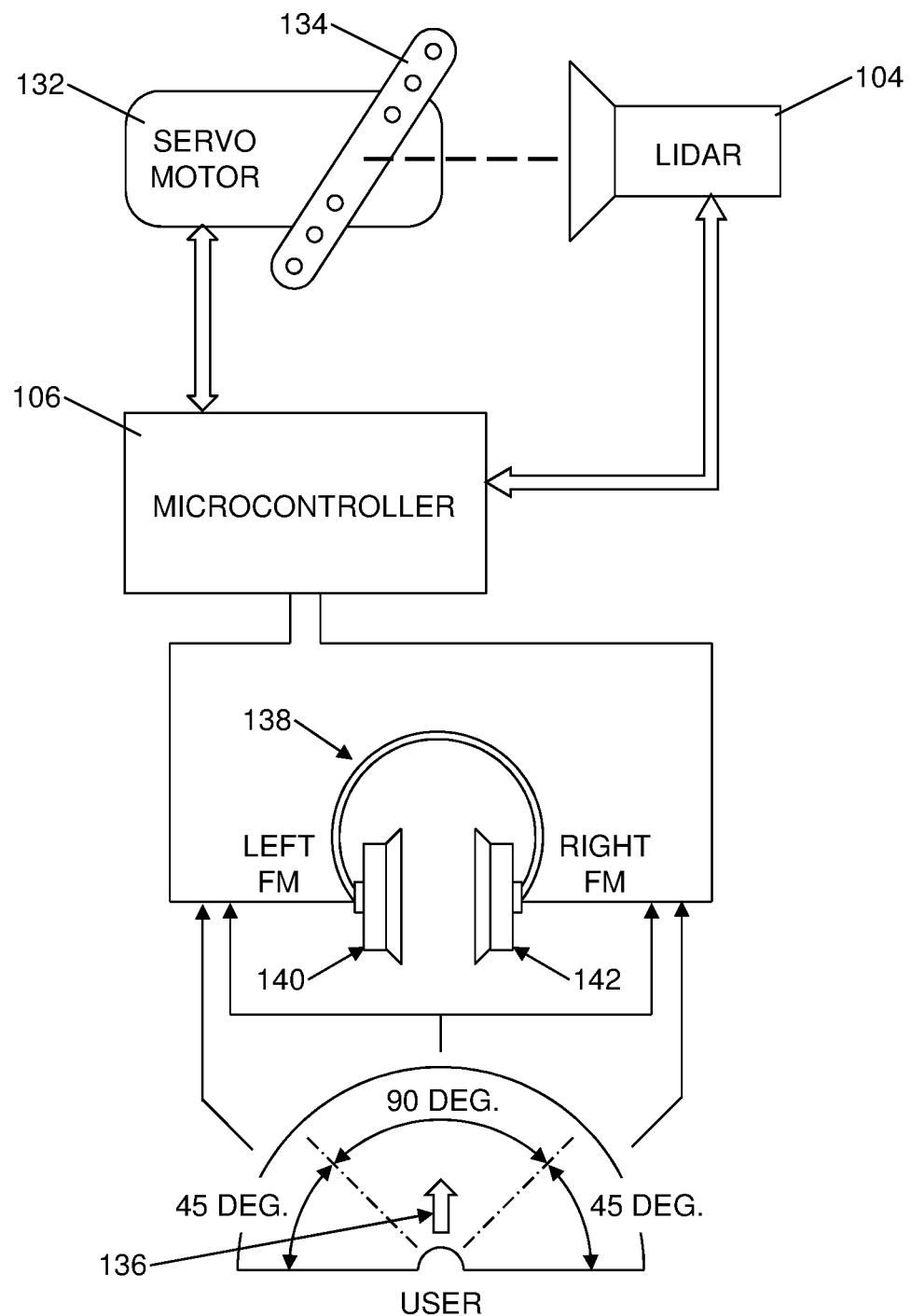
FIG. 6 depicts dual audio components for the distance sensing mobility assistance apparatus.

The distance sensing mobility assistance apparatus 100 of FIG. 1A and FIG. 1B, as modified according to the example of FIG. 5, may be additionally enhanced by adding dual audio components, for example in the form of headphones 138, including a left speaker 140 and a right speaker 142, as depicted in FIG. 6. The microcontroller 106 includes instructions for providing a left audio FM signal to the left speaker 140 and instructions for providing a right audio FM signal to the right speaker 142. During operation of the distance sensing mobility assistance apparatus 100, the microcontroller 106 may send the left audio FM signal, denoted "LEFT FM" in FIG. 6, to the left speaker 140 of the headphones 138, and send the right audio FM signal, denoted "RIGHT FM" in FIG. 6, to the right speaker 142 of the headphones 138.

In one version of this example, the left audio FM signal may be generated for obstacles detected in a scanned arc of approximately 45 degrees on a left side of the user, denoted "USER" in FIG. 6. Similarly, the right audio FM signal may be generated for obstacles detected in a scanned arc of approximately 45 degrees on a right side of the user, as indicated in FIG. 6. For obstacles detected in a scanned arc of approximately 90 degrees centered on the forward direction 136 from the user, the microcontroller 106 may send a resulting audio FM signal to both the left speaker 140 and the right speaker 142, as indicated in FIG. 6.

In another version of this example, the microcontroller 106 may produce a stereo audio signal for the headphones 138, in which a left/right balance of the stereo audio signal corresponding to a detected obstacle is adjusted to reflect the angle at which the obstacle is detected. In either version, the audio FM signals to the headphones 138 may advantageously enable the user to estimate both a distance and direction of obstacles in the user's intended path. The headphones 138 may be substituted for the audio signal component 110 of FIG. 1A and FIG. 1B.

Figure 7:
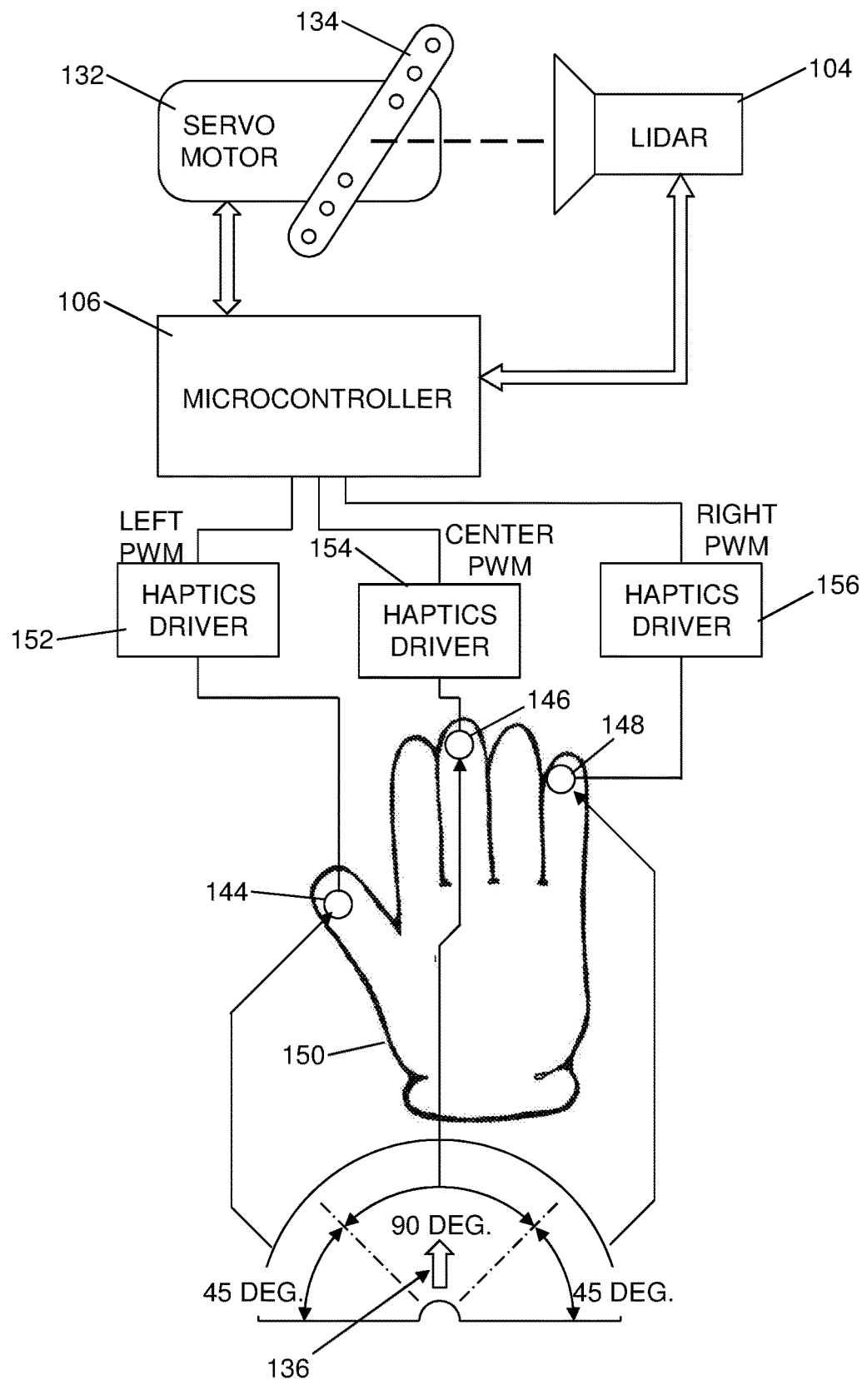
FIG. 7 depicts a left haptic component, a center haptic component, and a right haptic component for the distance sensing mobility assistance apparatus.

The distance sensing mobility assistance apparatus 100 of FIG. 1A and FIG. 1B, as modified according to the example of FIG. 5, may be further enhanced by adding a left haptic signal component 144, a center haptic signal component 146, and a right haptic signal component 148 to a first user-wearable component 150, for example in the form of a haptic glove 150, as depicted in FIG. 7. The left haptic signal component 144 is interfaced to the microcontroller 106 through a left haptic driver component 152. The center haptic signal component 146 is interfaced to the microcontroller 106 through a center haptic driver component 154.

The right haptic signal component 148 is interfaced to the microcontroller 106 through a right haptic driver component 156. The microcontroller 106 includes instructions for providing a left PWM haptic signal to the left haptic driver component 152, instructions for providing a center PWM haptic signal to the center haptic driver component 154, and instructions for providing a right PWM haptic signal to the right haptic driver component 156.

During operation of the distance sensing mobility assistance apparatus 100, the microcontroller 106 may send a left PWM haptic signal, denoted "LEFT PWM" in FIG. 7, to the left haptic signal component 144 through the left haptic driver component 152, send a center PWM haptic signal, denoted "CENTER PWM" in FIG. 7, to the center haptic signal component 146 through the center haptic driver component 154, and send a right PWM haptic signal, denoted "RIGHT PWM" in FIG. 7, to the right haptic signal component 148 through the right haptic driver component 156. The left PWM haptic signal may be generated for obstacles detected in a scanned arc of approximately 45 degrees on a left side of the user, denoted "USER" in FIG. 7. The center PWM haptic signal may be generated for obstacles detected in a scanned arc of approximately 90 degrees centered on the forward direction 136 from the user, as indicated in FIG. 7. The right PWM haptic signal may be generated for obstacles detected in a scanned arc of approximately 45 degrees on a right side of the user, as indicated in FIG. 7. The PWM haptic signals to the haptic glove 150 may advantageously enable the user to estimate both a distance and direction of obstacles in the user's intended path. The haptic glove 150 may be substituted for the haptic signal component 112 of FIG. 1A and FIG. 1B. The haptic glove 150 may be particularly useful to visually impaired users that are also hearing-impaired.

Figure 8:
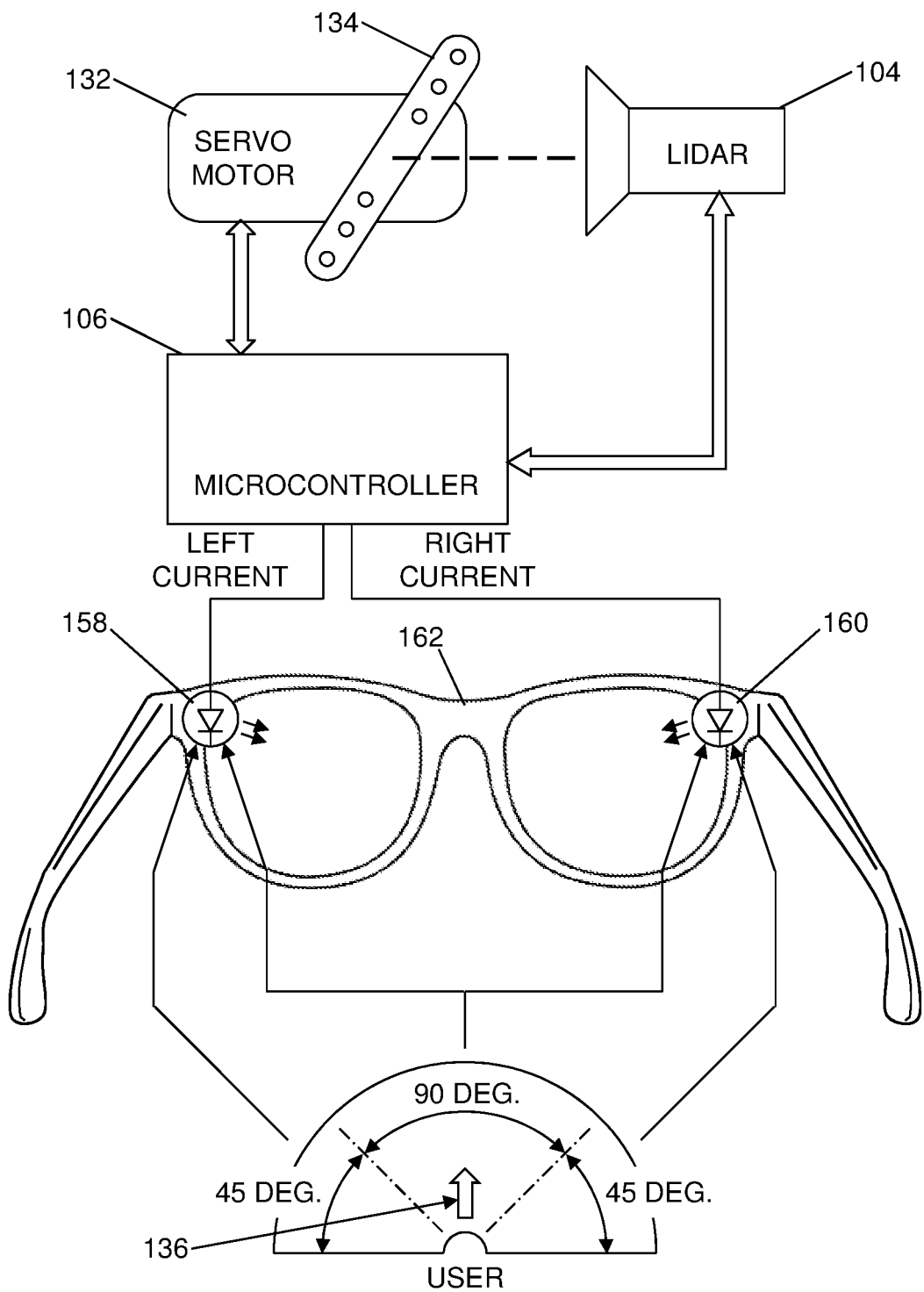
FIG. 8 depicts a left light-emitting component and a right light-emitting component for the distance sensing mobility assistance apparatus.

The distance sensing mobility assistance apparatus 100 of FIG. 1A and FIG. 1B, as modified according to the example of FIG. 5, may be further enhanced by adding a left light-emitting component 158 and a right light-emitting component 160 to a second user-wearable component 162, for example in the form of a modified pair of eyeglasses 162, as depicted in FIG. 8. The left light-emitting component 158 and the right light-emitting component 160 may be implemented as LEDs, as indicated schematically in FIG. 8.

During operation of the distance sensing mobility assistance apparatus 100, the microcontroller 106 may send a left current, denoted "LEFT CURRENT" in FIG. 8, to the left light-emitting component 158, and send a right current, denoted "RIGHT CURRENT" in FIG. 8, to the right light-emitting component 160. The left current may be generated for obstacles detected in a scanned arc of approximately 45 degrees on a left side of the user, denoted "USER" in FIG. 8. The right current may be generated for obstacles detected in a scanned arc of approximately 45 degrees on a right side of the user, as indicated in FIG. 8. For obstacles detected in a scanned arc of approximately 90 degrees centered on the forward direction 136 from the user, the microcontroller 106 may send the resulting currents to both the left light-emitting component 158 and the right light-emitting component 160, as indicated in FIG. 8. The left light-emitting component 158 and the right light-emitting component 160 may be interfaced to the microcontroller 106 by a wired connection, or by a wireless connection, such as a Bluetooth™ connection.

In one version of this example, the left light-emitting component 158 may include two or three LEDs of different colors, and similarly for the right light-emitting component 160. The microcontroller 106 may send currents to the appropriate LEDs depending on the estimated distances to the detected obstacles, providing the user with additional information on obstacles in the users intended path.

In another version of this example, the modified pair of eyeglasses 162 may include one or more LEDs located near a center of the modified pair of eyeglasses 162, for example on a bridge between lenses of the modified pair of eyeglasses 162. The microcontroller 106 may send a center current to the LEDs located near the center of the modified pair of eyeglasses 162 for obstacles detected in a scanned arc of approximately 90 degrees centered on the forward direction 136 from the user, providing more clarity as to directions of obstacles in the users intended path.

The modified pair of eyeglasses 162 with the left light-emitting component 158 and the right light-emitting component 160 may be useful to users that have some visual capability. The modified pair of eyeglasses 162 with the left light-emitting component 158 and the right light-emitting component 160 may be substituted for the light-emitting signal component 118 of FIG. 1A and FIG. 1B.

Figure 9:
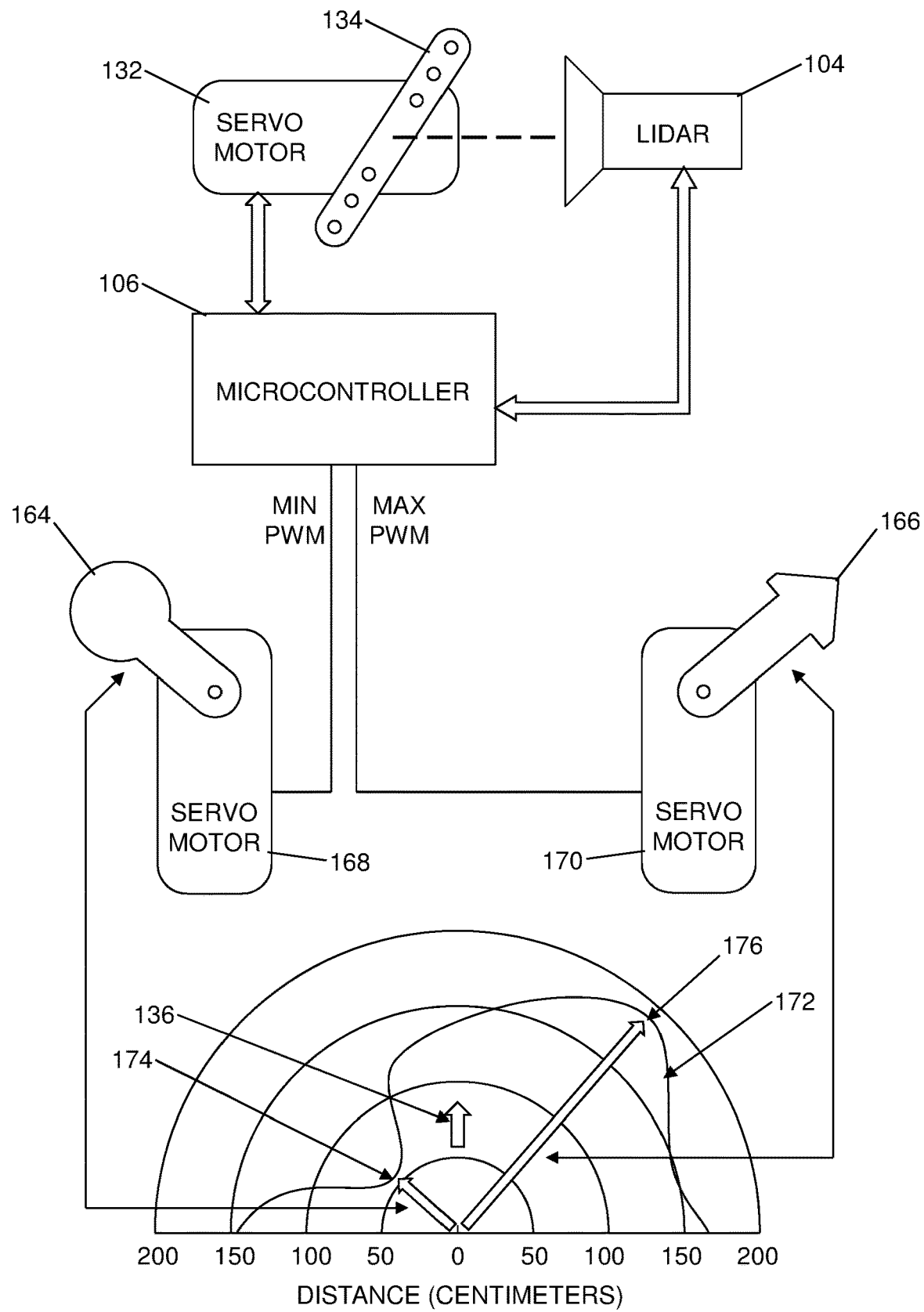
FIG. 9 depicts a minimum directional indicator and a maximum direction indicator for the distance sensing mobility assistance apparatus.

The distance sensing mobility assistance apparatus 100 of FIG. 1A and FIG. 1B, as modified according to the example of FIG. 5, may be additionally enhanced by adding a minimum directional indicator 164 and a maximum directional indicator 166, as depicted in FIG. 9. The minimum directional indicator 164 may be mounted on a minimum directional servo motor 168, which is interfaced to a PWM terminal of the microcontroller 106. The maximum directional indicator 166 may be mounted on a maximum directional servo motor 170, which is interfaced to another PWM terminal of the microcontroller 106. The minimum directional servo motor 168 and the maximum directional servo motor 170 may be attached to the frame 102 of FIG. 1A and FIG. 1B. The microcontroller 106 includes instructions for sending scan signals to the LiDAR scan servo motor 132, so that the LiDAR component 104 is scanned through an angle of approximately 90 degrees on each side of the forward direction 136 to provide a total scan angle of approximately 180 degrees. The microcontroller 106 additionally includes instructions to record distance information from the LiDAR component 104 while the LiDAR component 104 is scanned. The microcontroller 106 further includes instructions to identify a minimum direction 174 having a minimum distance to an obstacle, and to identify a maximum direction 176 having a maximum distance to an obstacle, from the distance information. The microcontroller 106 includes instructions for generating a minimum PWM signal to the minimum directional servo motor 168 so that the minimum directional indicator 164 points in the minimum direction 174, and for generating a maximum PWM signal to the maximum directional servo motor 170 so that the maximum directional indicator 166 points in the maximum direction 176.

During operation of the distance sensing mobility assistance apparatus 100, the microcontroller 106 sends scan signals to the LiDAR scan servo motor 132, so that the LiDAR component 104 is scanned through an angle around the user, denoted "USER" in FIG. 9, of approximately 90 degrees on each side of the forward direction 136 from the user, as indicated in FIG. 9, to provide a total scan angle of approximately 180 degrees. As the LiDAR component 104 is scanned, distance information is sent to the microcontroller 106 and recorded, to provide a distance contour 172 which has distance estimates to obstacles at angles through the scanned angle around the user. The microcontroller 106 identifies the minimum direction 174 corresponding to an angle of the distance contour 172 with a minimum distance to an obstacle, and identifies the maximum direction 176 corresponding to an angle of the distance contour 172 with a maximum distance to an obstacle. The microcontroller 106 sends the minimum PWM signal, denoted "MIN PWM" in FIG. 9, to the minimum directional servo motor 168, so that the minimum directional indicator 164 points in the minimum direction 174. Similarly, the microcontroller 106 sends the maximum PWM signal, denoted "MAX PWM" in FIG. 9, to the maximum directional servo motor 170, so that the maximum directional indicator 166 points in the maximum direction 176. The minimum directional indicator 164 and the maximum directional indicator 166 may be sensed by the user, for example, by touch, to obtain direction information for adjusting an intended path. Tests with a prototype of the distance sensing mobility assistance apparatus 100 have shown users with a minimum of training can use the minimum directional indicator 164 and the maximum directional indicator 166 to navigate a path through a complex set of obstacles.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:

1. A distance sensing mobility assistance apparatus, comprising:
a frame;
an Arduino microcontroller attached to the frame;
a light detection and ranging (LiDAR) component coupled to the frame, the LiDAR component being interfaced to the Arduino microcontroller, the Arduino microcontroller including instructions for initiating a distance measurement by the LiDAR component, instructions for reading a distance signal from the LiDAR component, and instructions for calculating an estimated distance based on the distance signal;
an audio signal component interfaced to a first phase width modulation (PWM) output terminal of the Arduino microcontroller, the Arduino microcontroller including instructions for producing an audio FM signal based on the estimated distance, wherein a frequency of the audio FM signal is inversely dependent on the estimated distance, wherein the frequency increases when the estimated distance decreases, and instructions for providing the audio FM signal to the audio signal component;
a haptic driver component interfaced to a second PWM output terminal of the Arduino microcontroller, the Arduino microcontroller including instructions for producing a haptic PWM signal based on the estimated distance, wherein a duty cycle of the haptic PWM signal is inversely dependent on the estimated distance, wherein the duty cycle increases when the estimated distance decreases, and instructions for providing the haptic PWM signal to the haptic driver component;
a haptic signal component interfaced to the haptic driver component; and
a light-emitting signal component interfaced to a current output terminal of the Arduino microcontroller, the Arduino microcontroller including instructions for producing a current based on the estimated distance, and instructions for providing the current to the light-emitting signal component.

2. The distance sensing mobility assistance apparatus of claim 1, wherein the LiDAR component is directly coupled to the frame in a fixed position.

3. The distance sensing mobility assistance apparatus of claim 1, wherein the audio signal component is an 8 ohm speaker attached to the frame.

4. The distance sensing mobility assistance apparatus of claim 1, wherein the haptic driver component is a Texas Instruments™ DRV2605L Haptic Driver device.

5. The distance sensing mobility assistance apparatus of claim 1, wherein the haptic signal component is a coin type vibration motor attached to the frame.

6. The distance sensing mobility assistance apparatus of claim 1, wherein the light-emitting signal component includes at least one light emitting diode (LED) attached to the frame.

7. The distance sensing mobility assistance apparatus of claim 1, further comprising a LiDAR scan servo motor attached to the frame, the LiDAR scan servo motor including a scanned member, wherein the LiDAR component is attached to the scanned member, the Arduino microcontroller including instructions for scanning the LiDAR scan servo motor to scan the LiDAR component through an angle of approximately 90 degrees on each side of a forward direction, to provide a total scan angle of approximately 180 degrees.

8. The distance sensing mobility assistance apparatus of claim 7, wherein the audio signal component includes a pair of headphones including a left speaker and a right speaker, the Arduino microcontroller including instructions for providing a left PWM audio signal to the left speaker based on distance signals from a scanned arc of approximately 45 degrees on a left side of the forward direction, and including instructions for providing a right PWM audio signal to the right speaker based on distance signals from a scanned arc of approximately 45 degrees on a right side of the forward direction.

9. The distance sensing mobility assistance apparatus of claim 7, wherein the audio signal component includes a pair of headphones including a left speaker and a right speaker, the Arduino microcontroller including instructions for providing a stereo audio signal for the headphones, in which a left/right balance of the stereo audio signal corresponding to a detected obstacle is adjusted to reflect the angle at which the obstacle is detected, wherein the detected obstacle is at the estimated distance.

10. The distance sensing mobility assistance apparatus of claim 7, wherein the haptic signal component includes a first user-wearable component with a left haptic component interfaced to the Arduino microcontroller through a left haptic driver component, a center haptic component interfaced to the Arduino microcontroller through a center haptic driver component, and a right haptic component interfaced to the Arduino microcontroller through a right haptic driver component, the Arduino microcontroller including instructions for providing a left PWM haptic signal to the left haptic driver component, instructions for providing a center PWM haptic signal to the center haptic driver component, and instructions for providing a right PWM haptic signal to the right haptic driver component.

11. The distance sensing mobility assistance apparatus of claim 10, wherein the first user-wearable component includes a glove having the left haptic component, the center haptic component, and the right haptic component.

12. The distance sensing mobility assistance apparatus of claim 7, wherein the light-emitting signal component includes a second user-wearable component with a left light-emitting component interfaced to the Arduino microcontroller, and a right light-emitting component, the Arduino microcontroller including instructions for providing a left current to the left light-emitting component, and instructions for providing a right current to the right light-emitting component.

13. The distance sensing mobility assistance apparatus of claim 12, wherein the light-emitting signal component includes a modified pair of eyeglasses having the left light-emitting component and the right light-emitting component.

14. The distance sensing mobility assistance apparatus of claim 12, wherein the left light-emitting component includes at least one LED, and the right light-emitting component includes at least one LED.

15. The distance sensing mobility assistance apparatus of claim 7, further comprising:
 a minimum directional servo motor coupled to the frame, the minimum directional servo motor being interfaced to the Arduino microcontroller;
 a minimum directional indicator attached to the minimum directional servo motor;
 a maximum directional servo motor coupled to the frame, the maximum directional servo motor being interfaced to the Arduino microcontroller; and
 a maximum directional indicator attached to the maximum directional servo motor;
 wherein the Arduino microcontroller includes instructions for:
  sending scan signals to the LiDAR scan servo motor, so that the LiDAR component is scanned through an angle of approximately 90 degrees on each side of a forward direction;
  recording distance information from the LiDAR component while the LiDAR component is scanned;
  identifying a minimum direction having a minimum distance to an obstacle, using the distance information;
  identifying a maximum direction having a maximum distance to an obstacle, using the distance information;
  generating a minimum PWM signal to the minimum directional servo motor, so that the minimum directional indicator points in the minimum direction; and
  generating a maximum PWM signal to the maximum directional servo motor, so that the maximum directional indicator points in the maximum direction.

16. The distance sensing mobility assistance apparatus of claim 1, wherein a mass of the distance sensing mobility assistance is less than 1.5 kilograms.

\* \* \* \* \*